US006529211B2

(12) United States Patent
Ohara et al.

(10) Patent No.: US 6,529,211 B2
(45) Date of Patent: *Mar. 4, 2003

(54) HISTOGRAM-BASED INTENSITY EXPANSION

(75) Inventors: Kazuhiro Ohara, Allen, TX (US); William J. Sexton, The Colony, TX (US); Akira Takeda, Tokyo (JP); Gary Sextro, Frisco, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/338,165

(22) Filed: Jun. 22, 1999

(65) Prior Publication Data

US 2002/0101432 A1 Aug. 1, 2002

Related U.S. Application Data

(60) Provisional application No. 60/090,151, filed on Jun. 22, 1998.

(51) Int. Cl.[7] ................................................ G09G 5/10
(52) U.S. Cl. ..................................................... 345/690
(58) Field of Search ................................ 345/147, 690, 345/63, 77, 589, 691, 696; 382/168, 169, 172, 264, 274; 348/28, 30, 34, 297, 356, 439.1, 695, 704, FOR 159; 375/249; 386/370, 381; 710/68

(56) References Cited

U.S. PATENT DOCUMENTS 4,187,519 A * 2/1980 Vitols et al. ................ 358/169
5,528,703 A * 6/1996 Lee ............................ 382/257

5,954,653 A * 9/1999 Hatfield et al. ............. 600/443

FOREIGN PATENT DOCUMENTS

| EP | 0 648 040 A2 | 4/1995 | |
| EP | 0 684 733 A2 | 11/1995 | |
| EP | 0 762 736 A2 | 3/1997 | |
| JP | 04110920 A | * 4/1992 | ................ 345/148 |

OTHER PUBLICATIONS

Vishal Markandey, Kazuhiro Ohara, Marc Pyne, "DSP Algorithms for DLP™ Displays," ICSPAT 1997 (Sep. 15, 1997).

* cited by examiner

*Primary Examiner*—Matthew C. Bella
*Assistant Examiner*—G. F. Cunningham
(74) *Attorney, Agent, or Firm*—Charles A. Brill; Wade James Brady, III; Frederick J. Telecky, Jr.

(57) ABSTRACT

A method and apparatus for selectively scaling portions of image data based on the intensity levels of historical image data. The selective scaling, or level expansion, provides improved images by increasing or decreasing the intensity of a portion of image pixels. Black level expansion reduces the intensity of dark pixels and is appropriate when a relatively large number of the image pixels have a high intensity level. White level expansion increases the intensity of bright pixels and is appropriate when a relatively large number of image pixels have a low intensity level. Level expansion is implemented by using histogram comparators 402 to compare the intensity of each pixel with a threshold, typically on a frame-by-frame basis. When an adequate number of pixels in each frame meet the threshold criteria, the level expansion is increased. Field accumulator 404 is used to determine whether and by how much the image data is scaled. Field accumulator 404 increments each time a frame meets the expansion criteria, as determined by the histogram comparators 402, and decrements each time a frame does not meet the expansion criteria. The value accumulated by the field accumulator 404 is used by level expander 406 to scale at least a portion of the input data.

17 Claims, 8 Drawing Sheets

HISTOGRAM-BASED INTENSITY EXPANSION

This application claims priority under 35 USC §119(e)(1) of provisional application No. 60/090,151 filed Jun. 22, 1998.

FIELD OF THE INVENTION

This invention relates to the field of display systems, more particularly to processing image data for display systems.

BACKGROUND OF THE INVENTION

Advances in image display technology have improved the ability of image displays to recreate scenes with great accuracy. Many applications, however, must deal with human perception as they strive to produce images that are both accurate and visually pleasing. This is especially true in the field of digital image processing. While digital techniques provide very high resolution and color fidelity, digitally processing image data can lead to perceptible artifacts in the created images. What is needed is a system and method of improving perceived image quality while minimizing the degradation of image fidelity.

SUMMARY OF THE INVENTION

Objects and advantages will be obvious, and will in part appear hereinafter and will be accomplished by the present invention which provides a method and system for intensity level expansion. One embodiment of the claimed invention provides a method of processing image data that selectively scales portions of the image data based on the proportion of image pixels that meet predetermined intensity thresholds.

The method comprises the steps of: providing a first intensity threshold value, a frame intensity threshold value, and an intensity knee; receiving a series of frames of image data, the image data comprising at least one intensity data word for each pixel of each frame; comparing the intensity data words to the first threshold and accumulating a first number representative of the number of intensity data words in a frame that meet an intensity criteria relative to the first threshold; and scaling a portion of said intensity data words when said first accumulated number exceeds said frame intensity threshold value.

An optional additional step increments a frame accumulator value each time the first accumulated number exceeds the frame intensity threshold value, the step of scaling comprising scaling by a factor determined by the frame accumulator value. Another optional additional step decrements the frame accumulator value each time the first accumulated number does not exceed the frame intensity threshold value.

According to another embodiment, another method of processing image data is provided. The method comprising the steps of: providing a first intensity threshold value, a second intensity threshold value, a frame intensity threshold value, and an intensity knee; receiving a series of frames of image data, the image data comprising at least one intensity data word for each pixel of each frame; comparing the intensity data words to the first threshold and accumulating a first number representative of the number of intensity data words in a frame that meet an intensity criteria relative to the first threshold; comparing the intensity data words to the first threshold and accumulating a second number representative of the number of intensity data words in a frame that meet an intensity criteria relative to the second threshold; and scaling a portion of the intensity data words when the first accumulated number exceeds the first frame intensity threshold value and the second accumulated number exceeds the second frame intensity threshold value.

An optional additional step increments a frame accumulator value each frame the first accumulated number exceeds the first frame intensity threshold value and the second accumulated number exceeds the second frame intensity threshold value, the step of scaling comprising scaling the portion by a factor determined by the frame accumulator value.

Another optional additional step decrements the frame accumulator value each frame the first accumulated number does not exceed the first frame intensity threshold value or the second accumulated number does not exceed the second frame intensity threshold value.

According to another embodiment of the disclosed invention, a display system is provided. The display system comprising: a controller for selectively scaling input image data and a display device for displaying said selectively scaled image data. The controller comprising an input to receive the input image signal comprised of intensity data for a plurality of pixels and a level expansion circuit operable to monitor the intensity data an selectively scale portions of the intensity data based on the intensity data.

According to another embodiment, the level expansion circuit further comprises at least one histogram comparator operable to receive input data and an intensity threshold. The histogram comparator further operable to accumulate a number representing the number of pixels in the input image signal that meet an intensity criteria relative to the intensity threshold.

According to another embodiment, the level expansion circuit further comprises a field accumulator operable to receive a signal from at least one histogram comparator indicating that a sufficient number of pixels in the input image signal meet the intensity criteria. The field accumulator accumulates a value determined by the number of frames of the input image signal in which a sufficient number of pixels meet the intensity criteria.

According to yet another embodiment, the level expansion circuit further comprises a level expander operable to selectively scale portions of the intensity data based on the accumulated value from the field accumulator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new data processing technique has been developed which alters a digital image data stream in a way that improves the displayed images under certain conditions. This technique selectively scales the image data in certain images to increase the effective dynamic range of the output image. Increasing the dynamic range of the output image decreases saturation artifacts and increases image contouring. The technique is applied to input image data that is comprised primarily of either dark or light input values. Generally, the technique provides for continuously monitoring the image data stream and, when deemed to be beneficial, scaling the input data to spread the output data over a larger portion of the output range.

Intensity expansion, or intensity peaking, is the process of scaling an image to spread the image data across the potential intensity range of the image. For example, white level intensity expansion increases the intensity of the bright portions of an image. Conversely, black level intensity expansion decreases the intensity of the dark portions of an image.

Figure 1:
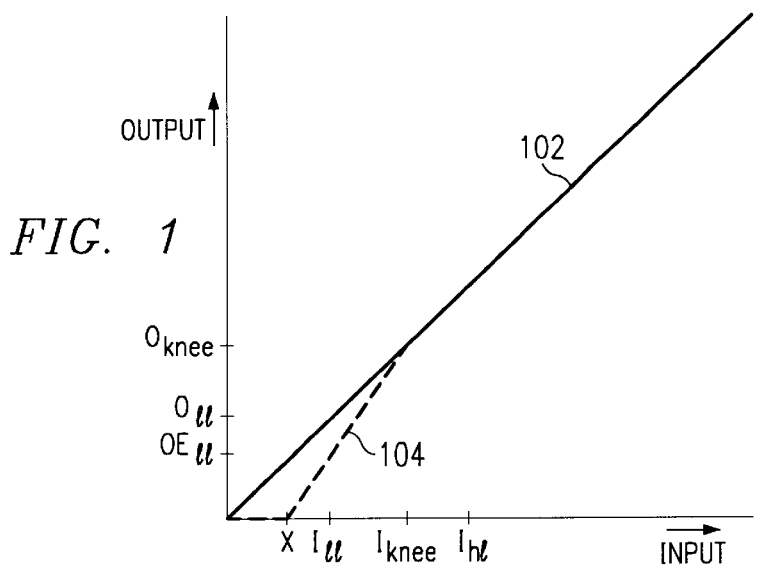
FIG. 1 is a plot of a display system response curve showing the effects of black level expansion.

FIG. 1 is a plot of a function for translating input image data to output image data. The translation curve 102 shown in FIG. 1 is a simple linear conversion between an input range on the x-axis and an output range on the y-axis. In the simplest case, the output data is equal to the input data. Alternatively, digital systems may convert an input word to an output word having a greater or lesser word size.

FIG. 1 includes a portion of a translation function 104, or a peaked translation function 104, showing the results of black level expansion. As shown by the peaked translation function 104, input values less than a given threshold, $I_{knee}$, are translated to smaller output values than the same input values would be translated to in the absence of black level expansion. Black level expansion has the effect of decreasing the intensity of a number of black or dark pixels in the image without effecting the bright pixels in the image.

Because intensity expansion depends on, and affects, the intensity of a pixel, it is most convenient to perform intensity expansion on data in the luminance-chrominance format (YUV). Nevertheless, intensity expansion may be performed on image data in any format, including RGB but at a much greater cost in processing power. Intensity expansion is readily implemented in digital display systems but may be implemented in analog systems as well.

The desirability of brightness expansion depends both on the type of image data being displayed and on the displayed image. For example, white level expansion is typically used when an image contains a large number of relatively dark pixels. Likewise, black level expansion is typically used when an image contains a large number of relatively bright pixels. White level expansion and black level expansion typically are not used simultaneously but may be useful when the image data is primarily mid-range intensity levels.

Since the desirability of intensity expansion depends at least in part on the image data, it is advantageous for a video display to automatically vary the level of expansion based on the contents of the video data stream. Therefore, the disclosed method and system provide a means of continuously monitoring a video data stream and variably expanding the video data stream based on the current and historical content of the video stream.

The disclosed method and system accumulates data describing the intensity of the video data for a current frame and multiple past frames. For the purposes of this disclosure, it is assumed that the image data is provided in a proscan, that is non-interlaced, format. Nevertheless, the inventive principles are applicable to interlaced image data as well as non-interlaced image data. Interlaced data is processed by accumulating data on either a field-by-field, or frame-by-frame basis. Thus the term frame in this specification and claims is intended to encompasses both the traditional terms field and frame in order to describe both interlaced and non-interlaced image data.

Current and past frame data is used both to enable intensity expansion, and also to control the amount of the expansion applied to the video data. According to one embodiment, the intensity of individual pixels is compared to a threshold and intensity expansion is performed when the percentage of pixels having an intensity above or below the threshold exceeds a given percentage. Alternate embodiments utilize multiple thresholds for white and black level expansion, and vary the magnitude of the expansion by a factor influenced either by the number of pixels that meet the threshold or by the number of recent image frames that have met a given intensity threshold.

One embodiment of the disclosed invention compares an intensity value for each pixel to a high level threshold and a low level threshold. The high level threshold, $I_{hl}$, and low level threshold, $I_{ll}$, typically are on opposite sides of the point at which the output scaling begins—called the knee ($I_{knee}$). If at least a minimum number of pixels exceed the high level threshold and no more than a maximum number of pixels are beneath the low level threshold, then the black level expansion is increased. For the purposes of this disclosure, increasing the expansion means the amount by which the data is scaled, or altered, whether positively or negatively, is increased or held at a maximum. Since the degree of expansion is based on intensity data from past frames, increasing the expansion can also mean increasing a counter used to determine whether to expand the data, or how much to expand the data, even if the counter has not exceeded a threshold at which actual data scaling begins.

For example, to perform black level expansion, a comparator determines whether an intensity value for a current pixel exceeds a predetermined high level threshold—that is, whether the current pixel is a "bright" pixel. A histogram counter records the number of pixels which exceed the high level intensity threshold over a given period—typically a frame period. A second comparator and a second histogram counter compare the same pixel intensity data to a predetermined low level threshold and accumulate the number of pixel intensity values which do not reach the low level threshold.

Since each of the histogram counters has accumulated the number of pixel intensity values exceeding an intensity threshold, and the number of pixels tested is fixed, the output of each histogram represents the proportion of pixels exceeding the threshold. Comparing the output of each histogram counter to a threshold value is equivalent to determining whether the bright or dark pixels exceed a given percentage of the total number of pixels during the predetermined period.

If both histogram counters exceed their respective thresholds, then a black level expansion field accumulator is incremented. The black level expansion field accumulator value determines the amount by which the input intensity data is scaled. Typically only pixel intensities less than a certain value, $I_{knee}$, are scaled.

FIG. 1 is a plot showing the relationship between the intensity value of the raw, or input image data and the scaled, or output image data with and without black level expansion. The solid line 102 in FIG. 1 indicates the relationship between input and output data when there is no scaling. The dashed line segment 104 in FIG. 1 indicates the relationship between input and output data over the range of input values which are scaled. In FIG. 1 the output values corresponding to input values above a threshold or knee, $t_{knee}$, are not scaled.

Figure 2:
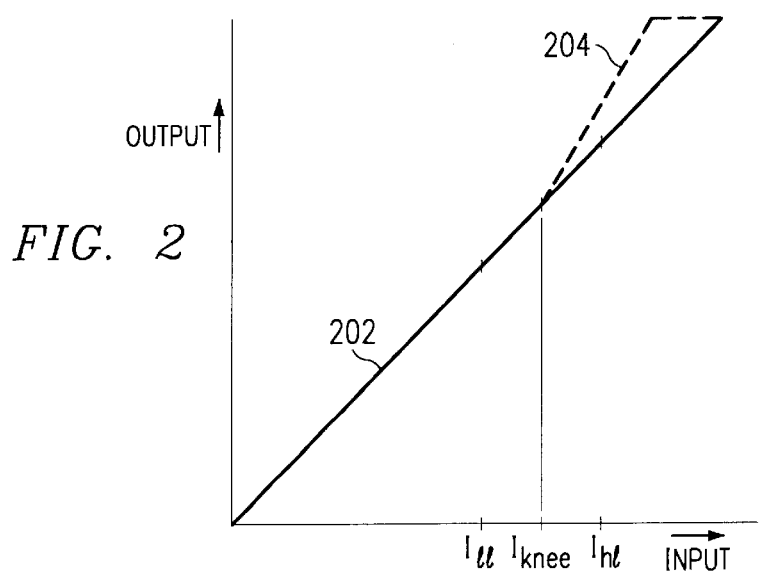
FIG. 2 is a plot of a display system response curve showing the effects of white level expansion.

FIG. 2 is a plot showing the relationship between the intensity value of the raw, or input image data and the scaled, or output image data with and without white level expansion. The solid line 202 in FIG. 2 indicates the relationship between input and output data when there is no scaling. The dashed line segment 204 in FIG. 2 indicates the relationship between input and output data over the range of input values which are scaled. In FIG. 2 the output values corresponding to input values below a threshold or knee, $t_{knee}$, are not scaled.

While intensity expansion does not change the number of image pixels whose value is greater than or less than the intensity knee, it does change the distribution of the intensities in the image. Black level expansion decreases the intensity of the pixels whose intensity is already less than the intensity knee. Likewise, white level expansion increases the intensity of the pixels whose intensity is already greater than the intensity knee.

Figure 3:
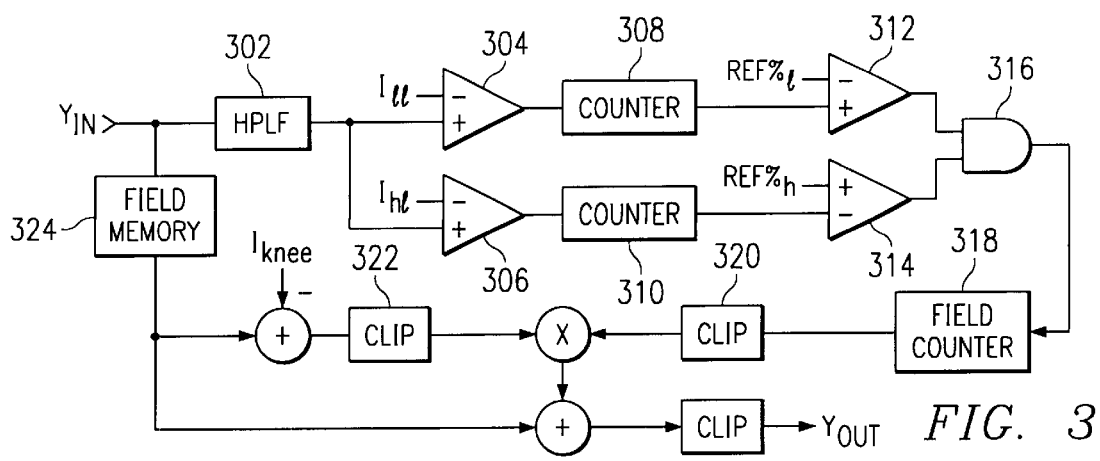
FIG. 3 is a block diagram of a circuit for performing black level expansion and white level expansion according to one embodiment of the disclosed invention.

FIG. 3 is a schematic diagram of one possible implementation of a histogram-based adaptive white level expansion circuit. In FIG. 3, intensity data for each pixel is input $Y_{in}$ and used to determine both how much intensity expansion will be performed and the output intensity $Y_{out}$ which is displayed. To prevent spurious intensity expansion, the input data is first smoothed using a horizontal low pass filter 302.

The smoothed input data is compared to the low level threshold intensity, $I_{ll}$, and the high level threshold intensity, $I_{hl}$, by comparators 304 and 306. If the smoothed input data exceeds the low level intensity threshold, counter 308 is incremented. Likewise, if the smoothed input data exceeds the high level intensity threshold, counter 310 is incremented.

The output of both counters are compared to thresholds by comparators 312 and 314. Comparator 312 outputs a logic true signal whenever the output value of counter 308 is greater than a low level reference level, $REF\%_l$. Typically the low level reference signal is a number representing sixty percent of the pixels in a given field. Comparator 314 outputs a logic true signal whenever the output value of counter 310 is less than a high level reference level, $REF\%_h$. The outputs of comparators 312 and 314 are gated by AND gate 316. If the outputs of both comparators 312 and 314 are logic true after the entire field is processed, the field counter 318 is incremented. Otherwise the field counter 318 is decremented. The output of the field counter 318 is clipped and the result is used by a multiplier 322 in the scaling circuit.

The scaling portion of the circuit operates by subtracting the intensity knee value, $I_{knee}$, from the input intensity and limiting the result to a positive value. The result is then multiplied by the clipped output of the field counter and added to the original input intensity. Thus, each field of input data that meets the threshold intensity requirements increases the amount of intensity scaling applied to the data, up to a maximum value, while each field of input data that does not meet the threshold intensity requirements decreases the amount of intensity scaling applied to the data. Black level expansion is performed in the same way except that limiting block 322 limits values to zero or negative values.

There are a great many alternatives to FIG. 3 which utilize the inventive concepts disclosed herein. For example, the polarity of the comparisons performed by the comparators 304, 306, 312, and 314 is easily inverted with very minor changes to the logic circuitry. Likewise, some embodiments replace the counters 308 and 310, comparators 312 and 314, and AND gate 316 with count-down counters and a logic circuit to verify both counters are zero by the end of the field. Yet another alternative incorporated a field memory 324 to align the results of the histogram comparison with the input data.

Figure 4:
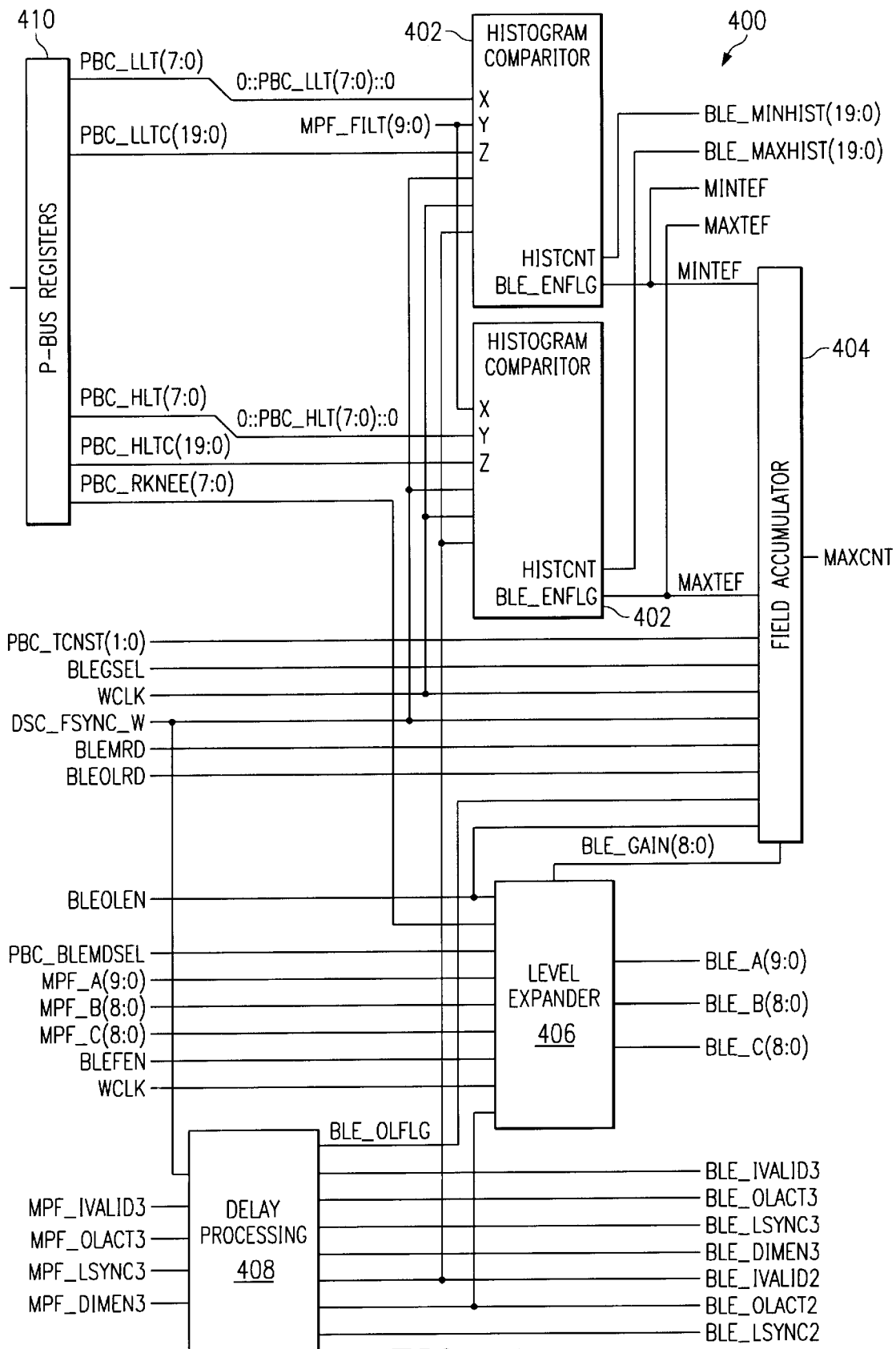
FIG. 4 is a block diagram of one embodiment of a level expansion circuit for implementing black level expansion and white level expansion.

FIG. 4 is a block diagram of one embodiment of a level expansion circuit 400 capable of implementing black level expansion and white level expansion. These algorithms are not generally recommended for graphical input sources, but can improve video images from non-computer graphics sources. In the following figures, unless otherwise stated, all level expansion registers and flip-flops in circuit 400 are clocked on the rising edge of WCLK and asynchronously reset when RSTZ is active.

The circuit shown in FIG. 4 uses a common knee ($I_{knee}$) and thresholds ($I_{ll}$ and $I_{hl}$) for both white level expansion and black level expansion. Each pixel in a filed is compared to the threshold values by two histogram comparators 402 that accumulate a histogram on a field by field basis. An image qualifies for black level expansion if the number of pixels which exceed the high level threshold ($I_{hl}$) exceeds a programmable high level count threshold and the number of pixels which fall below the low level threshold ($I_{ll}$) exceeds a programmable low level count threshold. Thus, black level expansion is used for relatively bright images that still have a significant portion of dark pixels. For black level expansion, a typical value for the high level threshold is 60% of the pixels in a given field and a typical value for the low level threshold is 20% of the pixels in a given field.

The circuit of FIG. 4 programs the thresholds so that they lie on opposite sides when performing white level expansion. The image then qualifies for white level expansion in the same manner it did for black level expansion. Thus, an image qualifies for white level expansion when the image is relatively dark yet still includes a significant number of bright pixels. For white level expansion, a typical value for the high level threshold is 20% of the pixels in a given field and a typical value for the low level threshold is 60% of the pixels in a given field.

If both histogram comparators 402 exceed their respective threshold count values, then the field accumulator 404 is incremented by 1. If both histogram comparators 402 do not exceed their threshold count values, the field accumulator 404 is decremented by 1. The value of the field accumulator determines how much level expansion is applied to the input signal. Thus, the level expansion is a function of previous scene information and has a time constant corresponding to the number of fields required to reach the maximum field count. The circuit of FIG. 4 has a programmable field count of 32, 64, 128, or 256 fields. A single histogram count should be used for every image portion when multiple processing paths are used to process portions of the image in parallel. Otherwise, various portions of the image are likely to have unequal level expansion applied, creating visible image artifacts.

The output of the field accumulator 404 controls the level expander block 406. The level expansion circuit 400 also includes a delay processing block 408 that delays some of the pipeline control signals to maintain synchronization with the processed data. Table 1 is a listing of the signals shown in FIG. 4. A P-Bus Register 410 contains nine eight-bit registers in which a processor can store the threshold, reference knee, and threshold count values.

TABLE 1

Level Expansion I/O

| SIGNAL NAME | I/O | BLOCK SIGNAL DESCRIPTION |
| --- | --- | --- |
| WCLK | I | Pixel Clock |
| RSTZ | I | System Reset |
| DSC_FSYNC | I | Frame Sync |
| MPF_OLACT3 | I | Overlay Active N |
| MPF_IVALID3 | I | Input Data Valid N |
| MPF_LSYNC3 | I | Line Sync N |
| MPF_DIMEN3 | I | OSD Dim Enable N |
| MPF_A(9:0) | I | Signed A Channel Data Bus |
| MPF_B(8:0) | I | Signed B Channel Data Bus |
| MPF_C(8:0) | I | Signed C Channel Data Bus |
| MPF_FILT(9:0) | I | Signed Filtered A Channel Data Bus |
| PBC_TCNST(1:0) | I | Level Expansion Time Constant |
| PBC_BLEMDSEL | I | Level Expansion Mode Select |
| PBC_RKNEE(7:0) | I | Level Expansion Knee |
| PBC_LLT(7:0) | I | Level Expansion Low Level Threshold |
| PBC_HLT(7:0) | I | Level Expansion High Level Threshold |
| PBC_LLTC(19:0) | I | Level Expansion Low Level Threshold Count |
| PBC_HLTC(19:0) | I | Level Expansion High Level Threshold Count |
| BLEFEN | I | Level Expansion Function Enable |
| BLEOLEN | I | Level Expansion Overlay Enable |
| BLEMRD | I | Level Expansion Master Ramp Down |
| BLEOLRD | I | Level Expansion Overlay Ramp Down |
| BLEGSEL | I | Level Expansion Gain Select |

TABLE 1-continued

Level Expansion I/O

| SIGNAL NAME | I/O | BLOCK SIGNAL DESCRIPTION |
| --- | --- | --- |
| BLE_MTNHIST(19:0) | O | Level Expansion Minimum Histogram Value |
| BLE_MAXHIST(19:0) | O | Level Expansion Maximum Histogram Value |
| BLE_OLACT3 | O | Overlay Active 3 |
| BLE_IVALID3 | O | Input Data Valid 3 |
| BLE_LSYNC3 | O | Line Sync 3 |
| BLE_DIMEN3 | O | On Screen Display Dimension Enable 3 |
| BLE_OLACT2 | O | Overlay Active 2 |
| BLE_IVALID2 | O | Input Data Valid 2 |
| BLE_LSYNC2 | O | Line Sync 2 |
| BLE_A(9:0) | O | Level Expansion Channel A Output |
| BLE_B(8:0) | O | Level Expansion Channel B Output |
| BLE_C(8:0) | O | Level Expansion Channel C Output |
| BLE_MINTEF | O | Level Expansion Minimum Threshold Flag |
| BLE_MAXTEF | O | Level Expansion Maximum Threshold Flag |
| BLE_MAXCNT | O | Level Expansion Maximum Count Flag |

The level expansion circuit 400 accepts 10-bit signed, 2's complement pre-filtered data on a dedicated A channel input and outputs either processed or unprocessed 10-bit signed, 2's complement values on the A channel. The level expansion circuit also has the capability to accept 9-bit signed, 2's complement data on the B and C channels and output the data unprocessed, but aligned with the corresponding A channel data.

If BLEOLEN=1 and OLACT=1 at any time during a given field—indicating an embedded overlay is enabled and present—the user has the option to force the field accumulator to decrement for the corresponding field. This is controlled by a level expansion overlay ramp down control parameter (BLEOLRD). This will ramp the level expansion off within the programmed time constant period. If BLEOLEN=0 or BLEOLRD=0, then OLACT shall not effect expansion processing. The user also has the option to turn off level expansion via the level expansion master ramp down control signal (BLEMRD) which is independent of other conditions.

P-bus register 410 is comprised of nine programmable registers. The contents of these registers determine the threshold values, threshold count values, and the location of the reference knee. All values stored in the P-bus register are unsigned positive numbers. A zero sign bit is appended to the register values for internal processing. Table 2 is a description of the P-bus register values, and Tables 3–5 show the magnitude of each bit in the various P-bus registers.

TABLE 2

P-Bus Register Definitions

| WORD | DESCRIPTION | REFERENCE | RESET VALUE |
| --- | --- | --- | --- |
| 0 | Low Level Threshold | PBC_LLT(7:0) | #x00 |
| 1 | High Level Threshold | PBC_HLT(7:0) | #x00 |
| 2 | Reference Knee | PBC_RKNEE(7:0) | #x00 |
| 3 | Low Level Threshold Count (LSW) | PBC_LLTC(7:0) | #x00 |
| 4 | Low Level Threshold Count (CSW) | PBC_LLTC(15:8) | #x00 |

TABLE 2-continued

P-Bus Register Definitions

| WORD | DESCRIPTION | REFERENCE | RESET VALUE |
|---|---|---|---|
| 5 | Low Level Threshold Count (MSW) | PBC_LLTC(19:16) | #x00 |
| 6 | High Level Threshold Count (LSW) | PBC_HLTC(7:0) | #x00 |
| 7 | High Level Threshold Count (CSW) | PBC_HLTC(15:8) | #x00 |
| 8 | High Level Threshold Count (MSW) | PBC_HLTC(19:16) | #x00 |

TABLE 3

P-Bus Register 5 & 8 Bit Values

| B7 | B6 | B5 | B4 | B3 | B2 | B1 | B0 |
|---|---|---|---|---|---|---|---|
|  |  |  |  | $2^{19}$ | $2^{18}$ | $2^{17}$ | $2^{16}$ |

TABLE 4

P-Bus Register 4 & 7 Bit Values

| B7 | B6 | B5 | B4 | B3 | B2 | B1 | B0 |
|---|---|---|---|---|---|---|---|
| $2^{15}$ | $2^{14}$ | $2^{13}$ | $2^{12}$ | $2^{11}$ | $2^{10}$ | $2^{9}$ | $2^{8}$ |

TABLE 5

P-Bus Register 0–3 and 6 Bit Values

| B7 | B6 | B5 | B4 | B3 | B2 | B1 | B0 |
|---|---|---|---|---|---|---|---|
| $2^{7}$ | $2^{6}$ | $2^{5}$ | $2^{4}$ | $2^{3}$ | $2^{2}$ | $2^{1}$ | $2^{0}$ |

Additional control signals are provided by a multi-purpose configuration register, a DPF2 configuration register, and an embedded overlay configuration register. The multi-purpose configuration register supplies the level expansion time constant, PBE_TCNST(1:0), which is used by the field accumulator 404 to control how quickly the level expansion will reach a maximum.

The multi-purpose configuration register also sources a level expansion master ramp down enable signal, BLEMRD, and an overlay ramp down enable signal, BLEOLRD. The overlay ramp down enable signal specifies whether or not to gracefully turn of the level expansion when overlays are present. If BLEOLRD=1 and both BLEOLEN and OLACT are simultaneously active at anytime during a given field, indicating an embedded overlay is enabled and present, the field accumulator 404 is forced to decrement for the corresponding field—ramping level expansion off within the programmed time constant. If BLEOLEN=0 or BLEOLRD=0, then OLACT shall not affect level expansion processing. The level expansion master ramp down enable signal, BLEMRD, specifies the field accumulator 404 will be forced to decrement for the corresponding field—ramping level expansion off within the programmed time constant regardless of any other signals. Although BLEFEN, BLEOLEN, and OLACT control the application of level expansion to a signal, they do not affect the operation of the histogram generation.

The DPF2 configuration register sources a level expansion function enable signal, BLEFEN, which specifies whether or not level expansion will be applied to the main channel processing (OLACT=0). When BLEFEN=0 and OLACT=0, the level expansion circuit passes signed, 2's complement data straight through on all three input channels without modification. When BLEFEN=1 and OLACT=0, level expansion is applied to channel A data. Data on channels B and C is delayed by an amount equal to the processing delay of channel A, but is not modified.

The embedded configuration register provides a level expansion overlay enable signal, BLEOLEN, which specifies whether level expansion will be applied to embedded overlay processing (OLACT=1). When OLACT=1 and BLEOLEN=0, signed, 2's complement data passes through unmodified on all three input channels. When OLACT=1 and BLEOLEN=1, level expansion is applied to the A channel data.

The multi-purpose configuration register supplies the level expansion mode select parameter, BLEMDSEL. This signal selects either the black level expansion or white level expansion mode of operation. The circuit 400 of FIG. 4 does not perform white level and black level expansion simultaneously. Tables 6 and 7 provide additional information on the mode control and configuration values.

TABLE 6

Level Expansion Control Selection

| Main Channel = | RGB or YUV | YUV | d | d |
|---|---|---|---|---|
| Overlay = | Off | Off | On | On |
| Overlay Type = | d | d | RGB or YUV | YUV |
| Level Expansion = | Off | On | On | On |
| BLEFEN = | 0 | 1 | d | d |
| BLEOLEN = | d | d | 0 | 1 |
| OLACT(N) = | 0 | 0 | 1 | 1 |
| Channel A Mode of Operation | Pass Thru | Level Expansion | Level Expansion | Level Expansion |
| Channel B & C Mode of Operation | Pass Thru | Pass Thru | Pass Thru | Pass Thru |

TABLE 7

Multi-purpose Level Expansion Register Bit Values

| BITS | DESCRIPTION | RESET VALUE |
|---|---|---|
| 15–11 | VNFCT(4:0) - Video Noise Filter Coring Threshold | #b10000 |
| 10–9 | EOMPFC(1:0) - Embedded Overlay Multi-Purpose Filter Configuration #b00 - Select Video Noise Filter Operation #b01 - Select Scaled Graphics Sharpness with Gain = 1.00 #b01 - Select Scaled Graphics Sharpness with Gain = 0.75 #b01 - Select Scaled Graphics Sharpness with Gain = 0.50 | #b00 |
| 8–7 | MCMPFC(1:0) - Main Channel Multi-Purpose Filter Configuration #b00 - Select Video Noise Filter Operation #b01 - Select Scaled Graphics Sharpness with Gain = 1.00 #b01 - Select Scaled Graphics Sharpness with Gain = 0.75 #b01 - Select Scaled Graphics Sharpness with Gain = 0.50 | #b00 |
| 6 | Reserved (read as zero) | #b0 |
| 5 | BLEMDSEL - Level Expansion Mode Select #b0 - Black Level Expansion Mode #b1 - White Level Expansion Mode | #b0 |

TABLE 7-continued

Multi-purpose Level Expansion Register Bit Values

| BITS | DESCRIPTION | RESET VALUE |
|---|---|---|
| 4 | BLEGSEL - Level Expansion Gain Select<br>#b0 - BLE gain is 0 to 1.25<br>#b1 - BLE gain is 0 to 1.50 | #b0 |
| 3 | BLEOLRD - Level Expansion Overlay Ramp Down Enable<br>#b0 - Disable Overlay Ramp Down<br>#b1 - Enable Overlay Ramp Down | #b0 |
| 2 | BLMRD - Level Expansion Master Ramp Down Enable<br>#b0 - Disable Master Ramp Down<br>#b1 - Enable Master Ramp Down | #b0 |
| 1–0 | TCNST(1:0) - Level Expansion Time Constant Select<br>#b00 = 31 fields<br>#b01 = 63 fields<br>#b10 = 127 fields<br>#b11 = 255 fields | #b10 |

Figure 5:
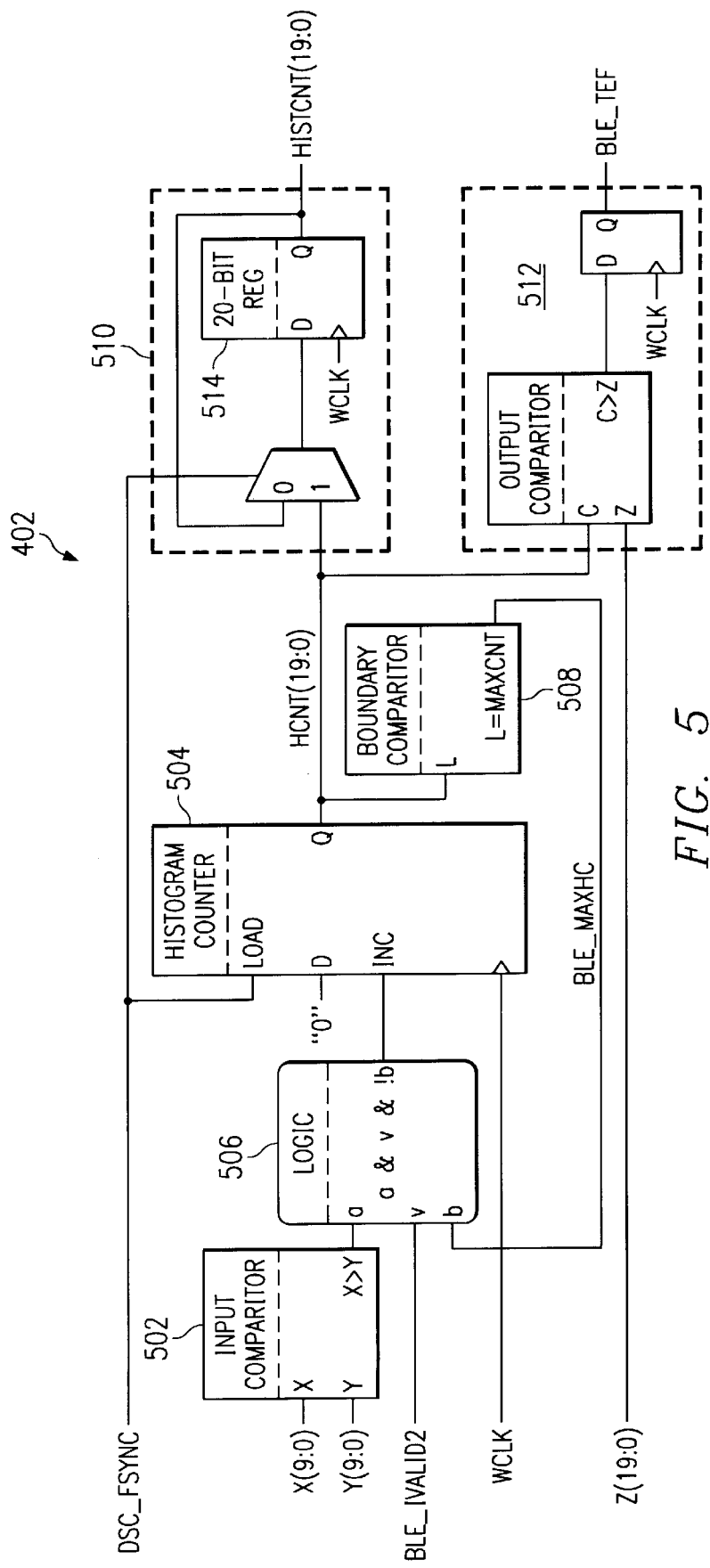
FIG. 5 is a schematic diagram of one embodiment of a histogram comparator for use with the level expansion circuit shown in FIG. 4.

FIG. 5 is a schematic diagram of the histogram comparator 402 of FIG. 4. The histogram comparator 402 is comprised of a input comparator 502, a histogram counter 504, load logic 506 and boundary condition logic 508 for the histogram comparator 504, a sample and hold circuit 510, and an output comparator circuit 512. The input comparator 502 compares the filtered A channel input pixel data to a programmable threshold level.

The circuit 400 of FIG. 4 uses two histogram comparators. Filtered data is applied to the X-input of one histogram comparator 402 and to the Y-input of the other histogram comparator 402. When the filtered data is applied to the X-input, and the high level threshold is applied to the Y-input, the input comparator 502 indicates when the input data exceeds the high level threshold. When the filtered data is applied to the Y-input and the high level threshold is applied to the X-input, the input comparator 502 indicates when the input data is less than the low level threshold.

The histogram counter 504 is incremented by one each time the input comparator 502 X-input exceeds its Y-input, IVALID is active high and the maximum histogram count condition flag, BLE_MAXHC, is inactive low. Thus, one histogram comparator 402 accumulates the number of pixels exceeding the high level threshold while the other histogram comparator 402 accumulates the number of pixels that are less than the low level threshold. The histogram counter 504 is loaded with zero upon the occurrence of FSYNC and is prevented from rolling over.

The sample and hold circuit 510 loads a sample and hold register 514 each FSYNC period. The output comparator 512 compares the histogram counter 504 output to a programmable count threshold applied to the Z-input. If the histogram counter value exceeds the count threshold the histogram comparator block will output an active high level expansion threshold exceedence flag, BLE_TEF.

Tables 8 and 9 detail the signals associated with the histogram comparators.

TABLE 8

Low Level Histogram I/O

| SIGNAL NAME | I/O | BLOCK SIGNAL DESCRIPTION |
|---|---|---|
| WCLK | I | Pixel Clock |
| RSTZ | I | System Reset |
| PBC_LLT(7:0) | I | X - Low Level Signal Threshold |
| BLE_FILT2(9:0) | I | Y - Filtered A Channel Level Expansion Data |
| PBC_LLTC(19:0) | I | Z - Low Level Count Threshold |
| BLE_IVALID2 | I | Input Data Valid 2 |
| DSC_FSYNC | I | Frame Sync. |
| MINHIST(19:0) | O | HISTCNT - Minimum Histogram Count Value |
| MINTEF | O | BLETEF - BLE Min Threshold Exceeded Flag |

TABLE 9

High Level Histogram I/O

| SIGNAL NAME | I/O | BLOCK SIGNAL DESCRIPTION |
|---|---|---|
| WCLK | I | Pixel Clock |
| RSTZ | I | System Reset |
| PBC_LLT(7:0) | I | X - Filtered A Channel Level Expansion Data |
| BLE_FILT2(9:0) | I | Y - High Level Signal Threshold |
| PBC_LLTC(19:0) | I | Z - High Level Count Threshold |
| BLE_IVALID2 | I | Input Data Valid 2 |
| DSC_FSYNC | I | Frame Sync. |
| MINHIST(19:0) | O | HISTCNT - Maximum Histogram Count Value |
| MINTEF | O | BLETEF - BLE Max Threshold Exceeded Flag |

Figure 6:
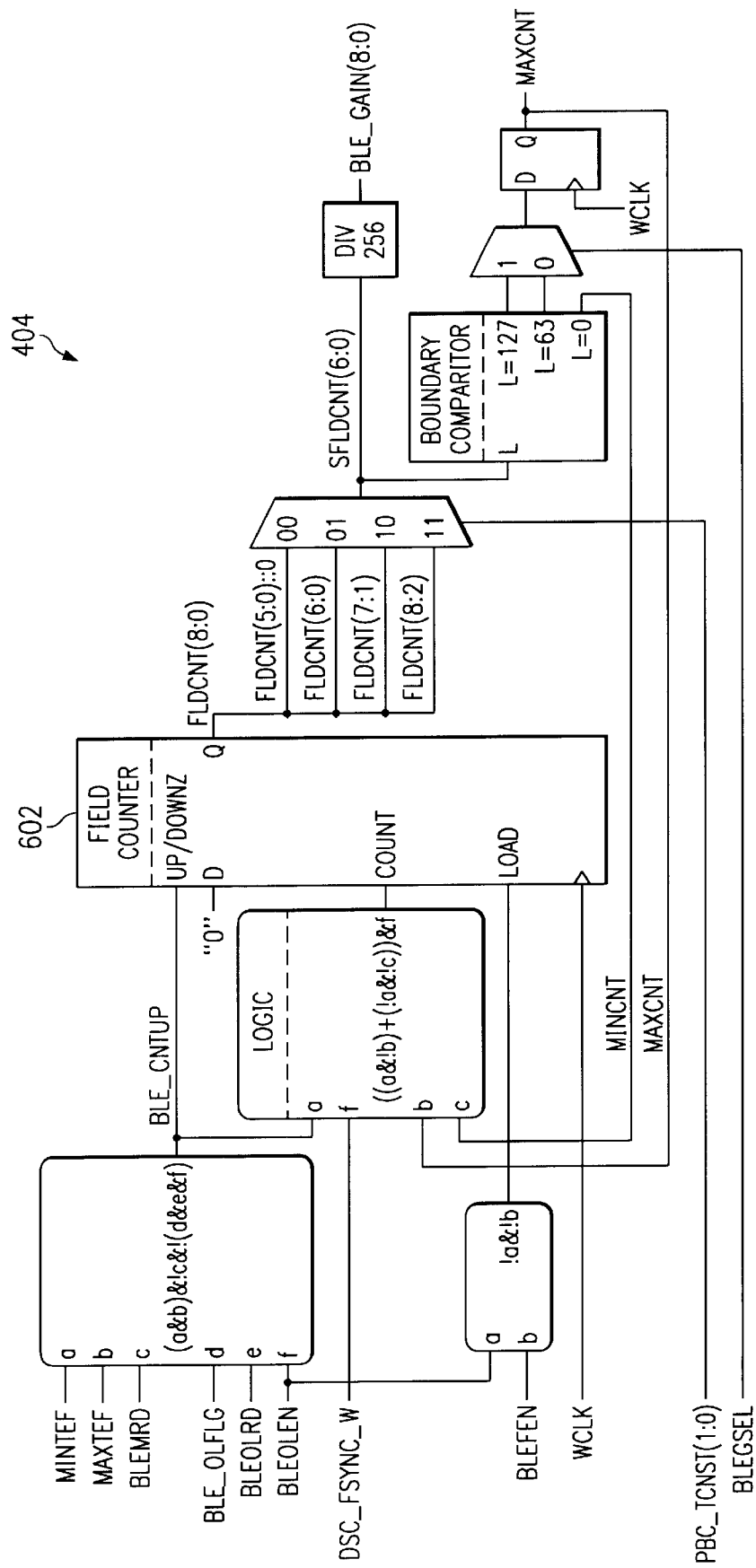
FIG. 6 is a schematic diagram of one embodiment of a field accumulator for use with the level expansion circuit shown in FIG. 4.

FIG. 6 is a schematic diagram of a field accumulator 404 of FIG. 4. The field accumulator provides an adaptive gain control to regulate the degree of level expansion given to the image data and serves as a hysteresis loop to avoid flicker. The field accumulator 404 accepts the minimum and maximum threshold exceedence flags, MINTEF and MAXTEF, from the two histogram comparator blocks 402. The field accumulator counter is incremented if both flags are active on the occurrence of FSYNC, and decremented if both flags are not active upon FSYNC.

The field accumulator counter 602 is a nine-bit counter which is inhibited from rolling over past a selectable TC value and also from rolling under past zero. The output of the counter is divided by a time constant time factor of ¼, ½, 1, or 2 and the result is clamped to a value of 63 or 127 dependent on the value of the level expansion gain select, BLEGSEL.

The scaled filed count signal, SFLDCNT(6:0), is converted to a level expansion gain control value by dividing it by 256 and adding a positive sign bit. This results in a 9-bit signed, 2's complement value, BLE_GAIN(8:0), which has eight fractional bits and zero significant bits.

Additional inputs ramp the level expansion off when certain conditions are met. If the level expansion is disabled, as indicated by BLEMRD=1, the field accumulator is forced to decrement each occurrence of FSYNC, regardless of the values of MINTEF or MAXTEF. Similarly, if BLEOLRD=1, BLEOLEN=1, and BLE_OLFLG=1, indicating an embedded overlay is enabled and present and that the level expansion ramp down is enabled, the field accumulator is forced to decrement at the next FSYNC—regardless of the values of MINTEF or MAXTEF. This will ramp level expansion off within the programmed time constant period.

Table 10 shows the input and output signals used by the field accumulator. Table 11 details the selection of a programmable time constant.

TABLE 10

Field Accumulator I/O

| SIGNAL NAME | I/O | BLOCK SIGNAL DESCRIPTION |
|---|---|---|
| WCLK | I | Pixel Clock |
| RSTZ | I | System Reset |
| MINTEF | I | Minimum Threshold Exceedence Flag |
| MAXTEF | I | Maximum Threshold Exceedence Flag |
| BLE_OLFLG | I | Overlay Active In Current Field Flag |
| DSC_FSYNC_W | I | Frame Sync |
| PBC_TCNST(1:0) | I | Level Expansion Time Constant Select |
| BLEFEN | I | Level Expansion Function Enable |
| BLEOLEN | I | Level Expansion Overlay Enable |
| BLEMRD | I | Level Expansion Master Ramp Down |
| BLEOLRD | I | Level Expansion Overlay Ramp Down |
| BLEGSEL | I | Level Expansion Gain Select |
| BLE_GAIN(8:0) | O | Level Expansion Gain Output |
| BLE_MAXCNT | O | Level Expansion Maximum Count |

TABLE 11

Field Accumulator Time Constant

| PBC_TCNST(1:0) | Time Constant Scale Factor | TC - Time Constant BLEGSEL = 0 | TC - Time Constant BLEGSEL = 1 |
|---|---|---|---|
| 00 | × 2 | 31 fields | 63 fields |
| 01 | × 1 | 63 fields | 127 fields |
| 10 | × ½ | 127 fields | 255 fields |
| 11 | × ¼ | 255 fields | 511 fields |

Figure 7:
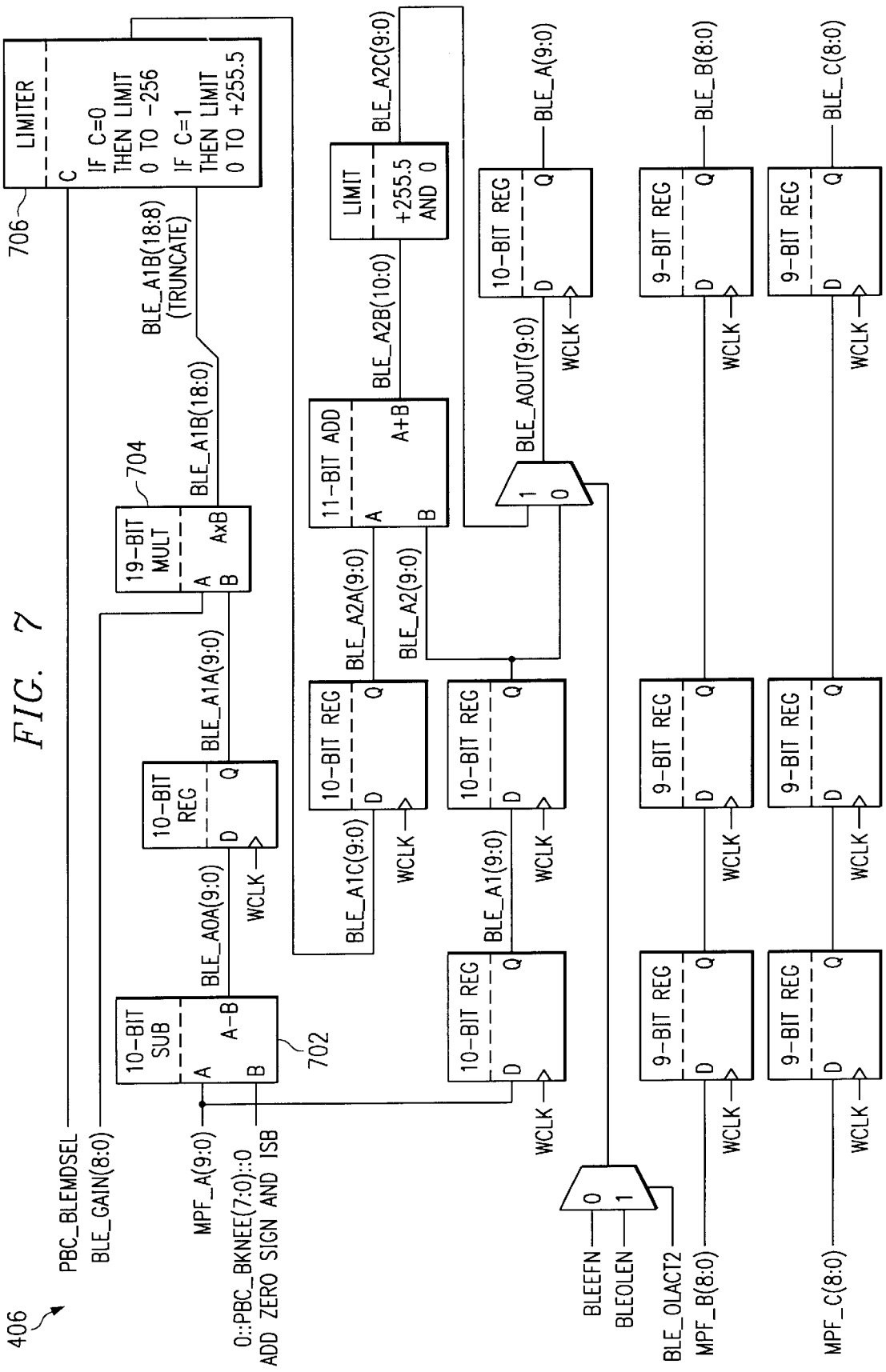
FIG. 7 is a schematic diagram of one embodiment of a level expander for use with the level expansion circuit shown in FIG. 4.
Figure 8A:
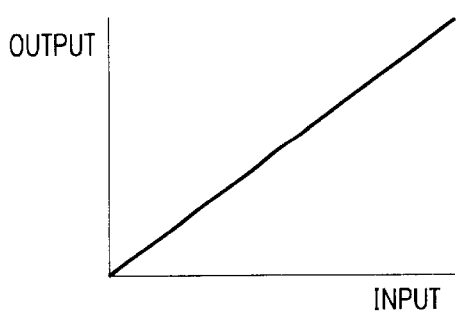
FIG. 8A is a plot showing the range of an unprocessed image input signal.
Figure 8B:
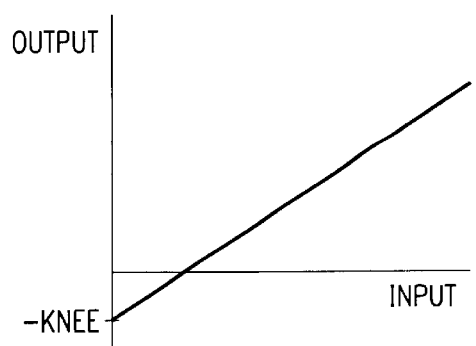
FIG. 8B shows the input signal of FIG. 8A after a reference value has been subtracted from it.
Figure 8C:
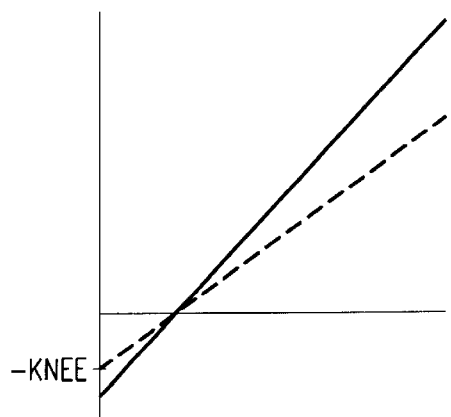
FIG. 8C shows the input signal of FIG. 8B after scaling by a gain factor.

FIG. 7 is a schematic diagram of a level expander 406 of FIG. 4. The level expander 406 uses input subtractor 702 to subtract the reference knee value from the input signal. FIG. 8A shows the range of the input signal and FIG. 8B shows the input signal after the reference value has been subtracted from it. Multiplier 704 scales the resulting values as shown in FIG. 8C by multiplying by a gain factor, BLE_GAIN (8:0).

Figure 8D:
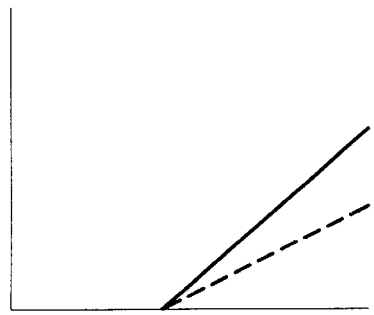
FIG. 8D is the scaled intensity signal of FIG. 8C clipped to encompass only positive output values in order to implement a white level expansion.
Figure 8E:
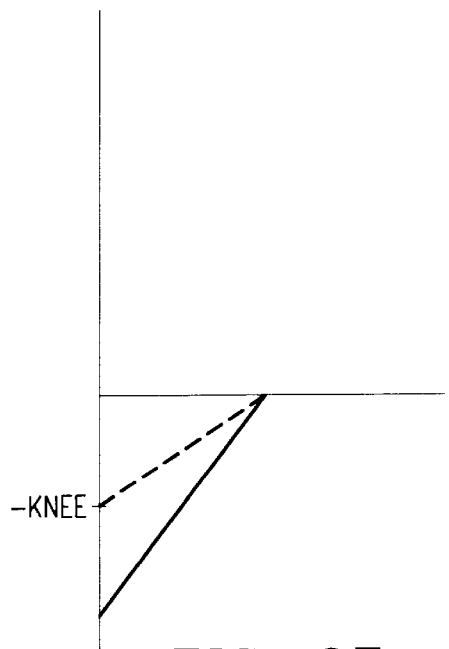
FIG. 8E is the scaled intensity signal of FIG. 8C clipped to encompass only negative output values in order to implement a black level expansion.
Figure 8F:
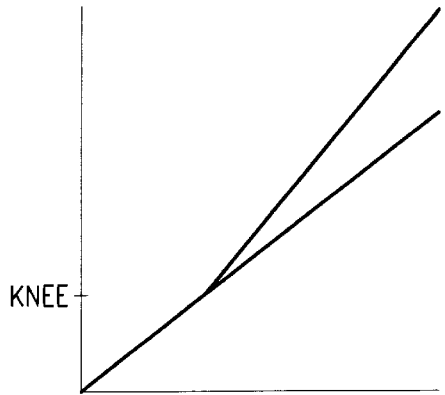
FIG. 8F shows the positive portion of the scaled intensity signal of FIG. 8D added to the original input signal.
Figure 8G:
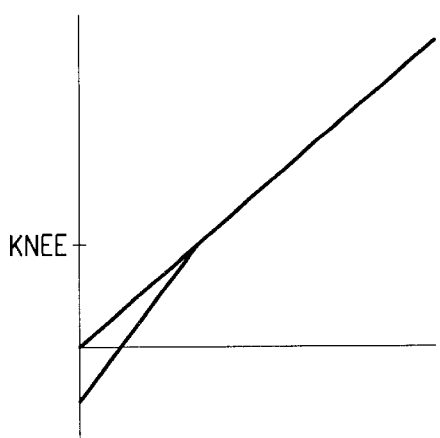
FIG. 8G shows the negative portion of the scaled intensity signal of FIG. 8E added to the original input signal.
Figure 8H:
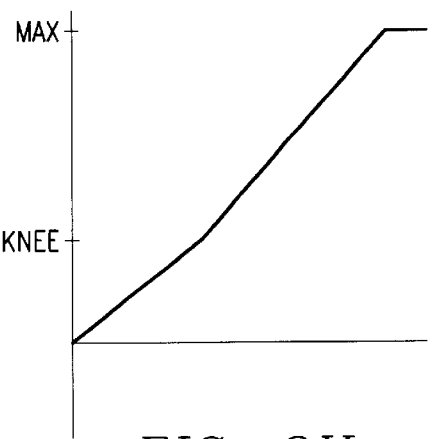
FIG. 8H shows the signal of FIG. 8F after being summed and clipped to the maximum output signal word size to provide a plot of the white level expansion signal transformation.
Figure 8I:
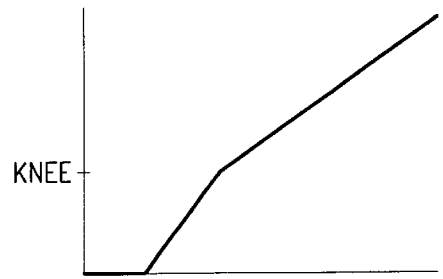
FIG. 8I shows the signal of FIG. 8G after being summed and clipped to the maximum output signal word size to provide a plot of the black level expansion signal transformation.

The scaled data is clipped, by limiter 706, to obtain either the positive portion of the scaled signal as shown in FIG. 8E or the negative portion of the scaled signal as shown in FIG. 8D. When the level expander 406 is performing white level expansion, as indicated by signal PBC_BLEMDSEL, the scaled signal is clipped to zero and positive values as shown in FIG. 8D. The scaled signal is clipped to zero and negative numbers, shown in FIG. 8E, when the level expander 406 is performing black level expansion. The scaled and clipped signal is added to a suitably delayed input signal by adder 708 before being constrained to the range of 0 to 255.5. FIG. 8H shows the resulting white level expansion function while FIG. 8I shows the resulting black level expansion function.

Table 12 lists the input and output signals used by the level expander circuit 406.

TABLE 12

Level Expander I/O

| SIGNAL NAME | I/O | BLOCK SIGNAL DESCRIPTION |
|---|---|---|
| WCLK | I | Pixel Clock |
| RSTZ | I | System Reset |
| MPF_A(9:0) | I | Signed A Channel Input Data |
| MPF_B(8:0) | I | Signed B Channel Input Data |
| MPF_C(8:0) | I | Signed C Channel Input Data |
| BLE_GAIN(8:0) | I | Level Expansion Gain |
| BLE_OLACT2 | I | Level Expansion Overlay Active 2 |

TABLE 12-continued

Level Expander I/O

| SIGNAL NAME | I/O | BLOCK SIGNAL DESCRIPTION |
|---|---|---|
| PBC_RKNEE(7:0) | I | Level Expansion Reference Knee |
| PBC_BLEMDSEL | I | Level Expansion Mode Select |
| BLEFEN | I | Level Expansion Function Enable |
| BLEOLEN | I | Level Expansion Overlay Enable |
| BLE_A(9:0) | O | Level Expansion A-Channel Output |
| BLE_B(9:0) | O | Level Expansion B-Channel Output |
| BLE_C(9:0) | O | Level Expansion C-Channel Output |

Figure 9:
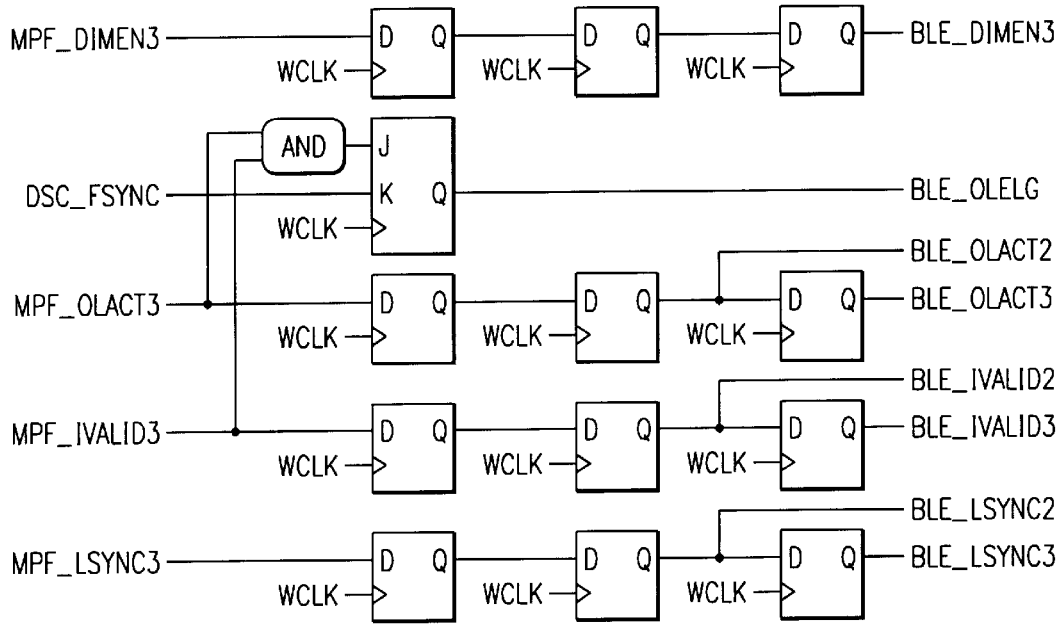
FIG. 9 is a schematic diagram of one embodiment of a delay processing block for use with the level expansion circuit shown in FIG. 4.

FIG. 9 is a schematic diagram of a delay processing block 408 of FIG. 4. The delay processing block 408 accepts several signals and passes them through a number of register delays. The register delays correspond to the delay incurred on the main data channel and maintain temporal alignment with the signals processed in the main channel. The delay processing block also generates an overlay present flag which is updated on a frame by frame basis. The overlay present flag is cleared every FSYNC and set whenever OLACT=1 and IVALID=1 simultaneously at any time during a frame period.

Table 13 lists the input and output signals used by the delay processing circuit.

TABLE 13

Delay Processing I/O

| SIGNAL NAME | I/O | BLOCK SIGNAL DESCRIPTION |
|---|---|---|
| WCLK | I | Pixel Clock |
| RSTZ | I | System Reset |
| MPF_OLACT3 | I | Brightness/Offset Overlay Active |
| MPF_IVALID3 | I | Brightness/Offset Input Data Valid |
| MPF_LSYNC3 | I | Brightness/Offset Line Sync |
| MPF_DIMENn | I | Brightness/Offset Dim Enable |
| DSC_FSYNC | I | Frame Sync |
| BLE_OLFLG | O | Level Expansion Overlay Frame Flag |
| BLE_IVALID2 | O | Level Expansion Input Data Valid 2 |
| BLE_OLACT2 | O | Level Expansion Overlay Active 2 |
| BLE_LSYNC2 | O | Level Expansion Line Sync 2 |
| BLE_OLACT3 | O | Level Expansion Overlay Active 3 |
| BLE_IVALID3 | O | Level Expansion Input Data Valid 3 |
| BLE_LSYNC3 | O | Level Expansion Line Sync 3 |
| BLE_DIMEN3 | O | Level Expansion Dim Enable |

Table 14 is a listing of one program designed to implement black and white level expansion.

TABLE 14

```
;******************************************
; UNIT NAME:          WHITE PEAKING
;
; UNIT IDENTIFIER:    not available
;
; DESCRIPTION:        This unit is the SVP IG code for SVP2 in the
;                     CDE configuration optional algorithms,
;                     including Motion Detection, Pro-scan and
;                     Oversampling FIR HV-scaling.
;
; TARGET/HOST:        TMDX57xx Scan-line Video Processor II (SVP2)
;
; MACRO ASSEMBLER:    ASMA_630.EXE and ASMB_630.EXE (2-PASS)
;
; MACRO LIBRARY:      MACO_312.LIB (New Macro format)
;
; REFERENCE:          DTV PDR
;
; DEPENDENCIES:
;
; LIMITATIONS:
;
; PTC SUPPORT CODE:   CT1300.PTC (PRO-SCAN HSYNC IMODE)
;
; ORIGINATOR EGR:     REV 0.0     AKIRA TAKEDA #690261
;
;******************************************
;
        eRI
        .width 132
;
;RF0:
;
RF00    .SET0   04h
RF01    .SET0   14h
RF02    .SET0   24h
;
Blu     .SET0   40h
Red     .SET0   54h
Grn     .SET0   68h
;
FREG    .SET0   84h
ACT     .SET0   9Eh
S00     .SET0   9Fh
;
;RF1:
YINP    .SET1   00h
UINP    .SET1   08h
VINP    .SET1   10h
;
RF10    .SET1   24h
RF11    .SET1   34h
RF12    .SET1   44h
;
Lmin    .SET1   60h
Lmax    .SET1   78h
;
S10     .SET1   9Fh
;
        m=m
HSYNC   JFAZ    $
        CLPZT   OUT'00,8, R0'Grn,10, R1'S10
        CLPZT   OUT'08,8, R0'Blu,10, R1'S10
        CLPZT   OUT'16,8, R0'Red,10, R1'S10
;
        UAUX
        UMR
        JME     HSYNC, 1                        ; IDLING
        JME     HDET, 10
;
        MOV     R1'YINP, INP'00,8               ;Y INPUT
        MOV     R1'UINP, INP'08,7               ;U(B-Y) IN
        NOT     R1'UINP+7,INP'15,1
        MOV     R1'VINP, INP'16,7               ;V(R-Y) IN
        NOT     R1'VINP+7,INP'23,1
;Y FRONT END
        set     r0'RF00, 48, 8                  ;offset
        SUB     r0'RF00, R1'YINP, 8, r0'RF00, 8, 0
        set     R0'RF02, 8, 4                   ;amplitude
```

TABLE 14-continued

```
        MLT     R1'RF11-5,13, R0'RF02,4, R0'RF00,9, 1
        ADD     R0'RF00, R0'RF00, 9, R1'RF11, 8, 3
        CLPZT   R1'YINP, 8, R0'RF00,10, R1'S10
;C FRONT END
        MLT     R0'RF01-5,12, R0'RF02,4, R1'UINP,8, 1
        ADD.    R0'RF01, R0'RF01, 7, R1'UINP, 8, 3
        MOV     R1'UINP, R0'RF01, 8
        MLT     R0'RF01-5,12, R0'RF02,4, R1'VINP,8, 1
        ADD     R0'RF01, R0'RF01, 7, R1'VINP, 8, 3
        MOV     R1'VINP, R0'RF01, 8
;
;* * * * * * * * * * * * * * * * * * * * * * * * * * * * * * * * * *
; * Black level expansion basic test
;*          y=x                     |        / y=x
;*           |                      |       /./
;*           |     /                |     ----./:
;*           |    /                 |       /: :
;*           |   /                  |      /:  :  :
;*           |  /                   |      :   :  :
;*         --/-----------           |   ---+-----------
;*          /|                      |      min p max
;*           |                      |
;* * * * * * * * * * * * * * * * * * * * * * * * * * * * * * * * * *
; (1) Vertical histogram counter
;LPF
        ADD     R0'RF00-2, R1'YINP, 8, RR1'YINP, 8, 0
        ADD     R0'RF00-1, R0'RF'00-1,8, LR0'RF'00-1,8, 0
;
;Black level detection
CPRC    R0'S00, 128'8, R0'RF00,8 ,2 ;Lin − 128 < 0 : 1
        ADD  R1'Lmin, R1'Lmin,9, R0'S00,1, 0 ;Increment histogram
; not       r1'S10, r0'S00, 1        ;>> 128<1max<192 case
;                                              ; counter
;White level detection
        CPRC R0'S00, 192,8, R0'RF00,8 ,0       ;192 − Lin < 0 : 1
        not r0'S00, r0'S00, 1                  ;>> 128<1max<192 case
        and r0'S00, r0'S00, r1'S10, 1          ;>> 128<1max<192 case
        ADD  R1'Lmax, R1'Lmax,9, R0'S00,1, 0 ;Increment histogram
;
; (2) P level decision
;
    addc r0'RF00, −128,8 r1'Yinp, 8, 0    ;p=128 (tilt point)
;
; (3) a level decision
        CLPZ    R1'RF10, R0'RF00, 9
        MLT     R0'RF01-9,16, R0'FREG, 8,R1'RF10, 8, 0   ;a=1~1.25 adaptive
        ADD     R0'RF01, R0'RF01, 7, R1'YINP,8, 0        ;inclination
;
; switch
;
        CLP     R0'RF01, 8, R0'RF01, 9, R1'S10
        jme     csc, 2
        MOV     R1'YINP, R0'RF01, 8
;
;* * * * * * * * * * * * * * * * * * * * * * * * * * * * * * * * * *
; *YUV Color Space:                                              *
; *The YUV color space is the basic color space used by the PAL  *
; *(Phase Alternative Line), NTSC (National Television System    *
; *Committee), and SECAM (Sequentiel Couleur Avec Memorie or     *
; *Sequential Color with Memory) composite color video standards *
; *The black-and-white system used only intensity (Y) infor-     *
; *mation; (U and V) was receiver would still display a normal   *
; *black-and-white picture. Color receivers decoded the          *
; *additional color information to display a color picture.      *
; *The basic equations to convert between gamma-corrected RGB    *
; *and YUV are:                                                  *
; *                                                              *
; *   Y = 0.299 R + 0.587 G + 0.114 B                            *
; *   U = −0.147 R − 0.289 G + 0.436 B                           *
; *   V = 0.615 R − 0.515 G − 0.100 B                            *
; *                                                              *
; *     R = Y + 1.140 V                                          *
; *     G = Y − 0.395 U − 0.581 V                                *
; *     B = Y + 2.032 U                                          *
; *                                                              *
; *       1.140 = 1167/1024 = 48Fh/400h                          *
; *       0.395 = 404/1024 = 194h/400h                           *
; *       0.581 = 595/1024 = 253h/400h                           *
; *       2.032 = 2081/1024 = 821h/400h                          *
```

TABLE 14-continued

```
;********************************************
; RED    ;
CSC     MOV  R0'Red-3, R1'VINP, 8              ;    @@@@@@@@
        ADD  R0'Red-0, R0'Red-0, 5, R1'VINP, 8, 3   ;    S$$$@@@@
        ADD  R0'Red-0, R0'Red-0, 9, R1'YINP, 8, 2   ;    S@@@@@@@
; BLUE
        SET  R0'Blu+0, 0, 1                    ;            0
        MOV  R0'Blu+1, R1'UINP, 8              ;    @@@@@@@@
        ADD  R0'Blu-0, R0'Blu-0, 9, R1'YINP, 8, 2   ;    S@@@@@@@
; GREEN .
        MOV  R0'Grn-3, Rl'UINP, 8              ;    @@@@@@@@
        ADD  R0'Grn-2, R0'Grn-2, 7, R1'UINP, 8, 3   ;    S$@@@@@@
        ADD  R0'Grn-1, R0'Grn-1, 8, R1'VINP, 8, 3   ;    S@@@@@@@
        SUB  R0'Grn-0, R1'YINP, 8, R0'Grn-0, 8, 1   ;    @@@@@@@@
;
JMP     HSYNC
;
;********************************************
;*Horizontal histogram counter (during V-Blanking)
;*
;*                   0 PE#   1    2       319 320       639
640
;*
;*V-accumulator result  [ ]      [ ]      [ ]    ~
;*                      \  \      \ /      / /
;*                       --------> + <--------
;*
;*
;*    |AUXF|<---|DOR|<---|NR|<---|CMP|
;*
;*
;********************************************
;                   480=1eOh             CPRC 0:">"
;                                             2:"<"
HDET CALL    VACC        ;
        CPRC   R0'RF02, 0f000h'19, R1'Lmax,19, 2  ;Lmax - 20% < 0:1
        MOV    R0'RF01, R1'Lmin, 9
        MOV    R1'Lmax, R0IRF01, 9
        CALL   VACC
        CPRC   R1S10, 2000h'19, R1'Lmax,19, 0    ;60% - Lmin < 0:1
        AND    R0'RF02,R0'RF02, R1S10, 1
        JFBZ   $
        MOV    OUT'31, R0'RF02,1
        JFAZ   $
        MOV    R0'ACT, AUXFB'31, 1
;
        not    r1'RF10+1, r0'ACT, 1              ; UP DOWN
        set    r1'RF10+0, 1, 1                   ; 01(+1) 11(-1)
        add    r0'FREG, r0'FREG, 8, r1'RF10, 2, 3  ;2's complement
        clpzt  r0'FREG, 7, r0'FREG, 9, r1'S10    ; response time
        set    r0'FREG+7, 0, 1                   ;=127 field
;
        SET    R1'Lmax, 0, 9              ;clear histogram counter
        SET    R1'Lmin, 0, 9              ;clear histogram counter
        jmp    HSYNC
;
;Horizontal histogram counter
;
VACC ADD     R1'Lmax, R1'Lmax, 9, rR1'Lmax, 9, 0
        KMOV1  R1'Lmax,1R1'Lmax,10, PENO'0       ; 2 (2^1) =1e0
        ADD    R1'Lmax, R1,Lmax,10,r2R1'Lmax,10, 0
        KMOV1  R1'Lmax,12R1'Lmax,11, PENO'1      ; 4 (2^2) =3c0
        ADD    R1'Lmax, R1,Lmax,11,r4R1,Lmax,11, 0
        KMOV1  R1'Lmax,14R1,Lmax,12, PENO128 (2A3) ~-780
;
        MOV    R0'RF01,r4R1'Lmax,12
        ADD    R1'Lmax R1'Lmax,12,r4R0'RF01,12, 0
        MOV    R0'RF01,14R1' Lmax,13
        KMOV1  R1'Lmax,14R0'RF01,13, PENO'3      ;16 (2^4) =f00
;
        MOV    R0'RF01,R4R1'Lmax,13
        MOV    R0'RF01,R4R0'RF01,13
        MOV    R0'RF01,R4R0'RF01,13
        MOV    R0'RF01,R4R0'RF01,13
        ADD    R1'Lmax, R1'Lmax,13, R0'RF01, 0 ;32 (16+16) =1e00
;
        CALL   GET1
        ADD    R1'Lmax, R1'Lmax,14, R0'RF01,13, 0 ;48 (32+16)   =2d00
```

TABLE 14-continued

```
        CALL    GET1
        ADD     R1'Lmax, R1'Lmax,15, R0'RF01,13, 0 ;64 (43+16)    =
        CALL    GET1
        ADD     R1'Lmax, R1'Lmax,16, R0'RF01,13, 0 ;80 (64+16)    =
        CALL    GET1
        ADD     R1'Lmax, R1'Lmax,17, R0'RF01,13, 0 ;96 (80+16)    =
        CALL    GET1
        ADD     R1'Lmax, R1'Lmax,18, RO'RF01,13, 0 ;112           =
;
        .loop i,0,32
        CALL GET2
        .end1
        RET
;Horizontal histogram counter subroutine
GET1    MOV     R0'RF01, R4R0'RF01, 13
        MOV     R0'RF01, R4R0'RF01, 13
        MOV     R0'RF01, R4R0'RF01, 13
        MOV     R0'RF01,R4R0'RF01,13
        RET
GET2    MOV     R0'RF01,R4R0'RF01,13
        MOV     R0'RF01,R4R0'RF01,13
        MOV     R0'RF01,R4R0'RF01,13
        MOV     R0'RF01,R4R0'RF01,13
        ADD     R1'Lmax, R1'Lmax,19, R0'RF01,13, 0
RET
        .end
```

Figure 10:
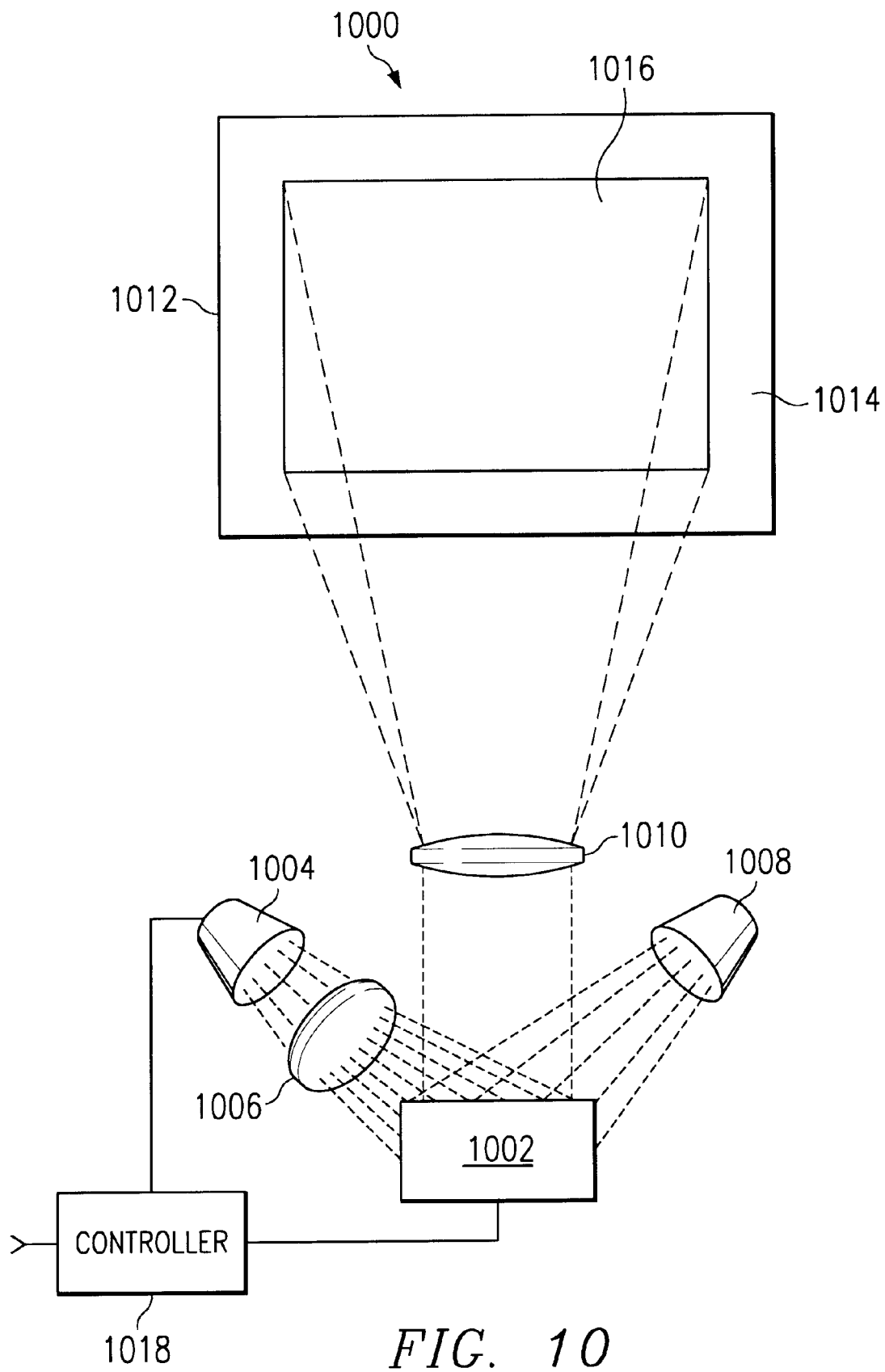
FIG. 10 is a block diagram of one embodiment of a display system incorporating histogram-based intensity expansion.

FIG. 10 is a block diagram of one embodiment of a display system 1000 incorporating the histogram-based intensity expansion described above. In FIG. 10, light from source 1004 is focused onto a spatial light modulator 1002 by a lens group 1006, shown as a single lens for purposes of illustration. The modulated light is projected by projection optics 1010, also shown as a single lens merely for purposes of illustration, onto an image plane 1012 to form an image 1016.

Controller 1018 receives an image data stream from an image source and monitors the intensity distribution of the pixels in each frame as described above. When the controller detects that intensity expansion, whether white-level, or black-level, or both, should be applied, the controller modifies the image intensity data as described above before transmitting the image data to the light modulator.

The light modulator 1002 is either transmissive or reflective. If a reflective light modulator 1002 is used, a light trap 1008 is typically included to absorb the unused light from the light source 1004. Furthermore, although shown in FIG. 10 as a separate light source 1004 and modulator 1002, and optical systems 1006, 1010, forming a display device, a modulated light source such as an LED array or CRT is used in place of the display device components shown in FIG. 10.

While this disclosure has discussed certain logical functions such as counting and comparing as counting up or exceeding a threshold, it should be understood that the equivalent opposite functions are also intended. For example, counting up to a maximum or threshold value is equivalent to counting down to a minimum or threshold value. Likewise, determining the percentage of pixels which exceed a certain threshold value is equivalent to determining the percentage of pixels which are less than a certain threshold value, that are equal to or greater than a threshold, or that are equal to or less than a threshold. Additionally, determining a percentage of pixels that meet an intensity criteria is equivalent to determining the number of pixels that meet the intensity criteria.

Thus, although there has been disclosed to this point a particular embodiment for a method of performing histogram based level expansion and a system therefor, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of processing image data, said method comprising the steps of:
   providing a first intensity threshold value and a frame intensity threshold value;
   receiving a series of frames of image data, said image data comprising at least one intensity data word for each pixel of each said frame;
   comparing said intensity data words to said first threshold and accumulating a first number representative of the number of said intensity data words in a frame that meet an intensity criteria relative to said first threshold; and
   scaling a portion of said intensity data words when said first accumulated number exceeds said frame intensity threshold value.

2. The method of claim 1, further comprising the step of:
   incrementing a frame accumulator value each time said first accumulated number exceeds said frame intensity threshold value, said step of scaling comprising scaling said portion by a factor determined by said frame accumulator value.

3. The method of claim 2, further comprising the step of:
   decrementing said frame accumulator value each time said first accumulated number does not exceed said frame intensity threshold value.

4. A method of processing image data, said method comprising the steps of:
   providing a first intensity threshold value, a second intensity threshold value, a first frame intensity threshold value, and a second frame intensity threshold value;
   receiving a series of frames of image data, said image data comprising at least one intensity data word for each pixel of each said frame;

comparing said intensity data words to said first threshold and accumulating a first number representative of the number of said intensity data words in a frame that meet an intensity criteria relative to said first threshold;

comparing said intensity data words to said second threshold and accumulating a second number representative of the number of said intensity data words in a frame that meet an intensity criteria relative to said second threshold; and scaling a portion of said intensity data words when said first accumulated number exceeds said first frame intensity threshold value and said second accumulated number exceeds said second frame intensity threshold value.

5. The method of claim 4, further comprising the step of:

incrementing a frame accumulator value each frame said first accumulated number exceeds said first frame intensity threshold value and said second accumulated number exceeds said second frame intensity threshold value, said step of scaling comprising scaling said portion by a factor determined by said frame accumulator value.

6. The method of claim 5, further comprising the step of:

decrementing said frame accumulator value each frame said first accumulated number does not exceed said first frame intensity threshold value or said second accumulated number does not exceed said second frame intensity threshold value.

7. A display system comprising:

a controller, said controller comprising;

an input to receive an input image signal comprised of intensity data for a plurality of pixels; and a level expansion circuit operable to monitor said intensity data and selectively scale portions of said intensity data based on said intensity data, said level expansion circuit comprising at least one histogram comparator operable to receive said input data and an intensity threshold and to accumulate a number representing the number of pixels in said input image signal that meet an intensity criteria relative to said intensity threshold;

a display device operable to receive said selectively scaled intensity data and to create an image using said selectively scaled intensity data.

8. The display system of claim 7, said level expansion circuit further comprising:

at least one histogram comparator, each said histogram comparator operable to receive said input data and an intensity threshold and to accumulate a number representing the number of pixels in said input image signal that meet an intensity criteria relative to said intensity threshold.

9. The display system of claim 8, said level expansion circuit further comprising:

a field accumulator operable to receive a signal from said at least one histogram comparator indicating that a sufficient number of pixels in said input image signal meet said intensity criteria, said field accumulator accumulating a value determined by the number of frames of said input image signal in which said sufficient number of pixels in said input image signal meet said intensity criteria.

10. The method of claim 1, said providing comprising providing an intensity knee and said scaling comprising:

scaling said intensity data words less than said intensity knee to increase the range of said intensity data words less than said intensity knee.

11. The method of claim 1, said providing comprising providing an intensity knee and said scaling comprising:

scaling said intensity data words equal to or less than said intensity knee to increase the range of said intensity data words less than said intensity knee.

12. The method of claim 1, said providing comprising providing an intensity knee and said scaling comprising:

scaling said intensity data words greater than said intensity knee to increase the range of said intensity data words less than said intensity knee.

13. The method of claim 1, said providing comprising providing an intensity knee and said scaling comprising:

scaling said intensity data words equal to or greater than said intensity knee to increase the range of said intensity data words less than said intensity knee.

14. The method of claim 4, said providing comprising providing an intensity knee and said scaling comprising:

scaling said intensity data words less than said intensity knee to increase the range of said intensity data words less than said intensity knee.

15. The method of claim 4, said providing comprising providing an intensity knee and said scaling comprising:

scaling said intensity data words equal to or less than said intensity knee to increase the range of said intensity data words less than said intensity knee.

16. The method of claim 4, said providing comprising providing an intensity knee and said scaling comprising:

scaling said intensity data words greater than said intensity knee to increase the range of said intensity data words less than said intensity knee.

17. The method of claim 4, said providing comprising providing an intensity knee and said scaling comprising:

scaling said intensity data words equal to or greater than said intensity knee to increase the range of said intensity data words less than said intensity knee.

* * * * *